United States Patent
Wang et al.

(10) Patent No.: US 10,056,591 B2
(45) Date of Patent: Aug. 21, 2018

(54) METHOD FOR PRODUCING SEPARATOR FILM

(71) Applicant: Sumitomo Chemical Company, Limited, Tokyo (JP)

(72) Inventors: Jian Wang, Daegu (KR); Koichiro Watanabe, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/360,222

(22) Filed: Nov. 23, 2016

(65) Prior Publication Data
US 2017/0179452 A1 Jun. 22, 2017

(30) Foreign Application Priority Data

Dec. 22, 2015 (JP) ................. 2015-250569

(51) Int. Cl.
| | |
|---|---|
| H01M 2/00 | (2006.01) |
| H01M 2/14 | (2006.01) |
| B05D 1/02 | (2006.01) |
| B05D 1/18 | (2006.01) |
| B05D 1/28 | (2006.01) |
| H01M 10/0525 | (2010.01) |

(52) U.S. Cl.
CPC .............. *H01M 2/145* (2013.01); *B05D 1/02* (2013.01); *B05D 1/18* (2013.01); *B05D 1/28* (2013.01); *H01M 10/0525* (2013.01)

(58) Field of Classification Search
USPC ......................................... 427/115, 173, 359
See application file for complete search history.

(56) References Cited

U.S. PATENT DOCUMENTS

| | | | | |
|---|---|---|---|---|
| 3,344,493 | A | * 10/1967 | Telgheider | ......... B65H 23/0253 |
| | | | | 162/271 |
| 2007/0026156 | A1 | * 2/2007 | Mandai | ..................... G03C 1/74 |
| | | | | 427/402 |
| 2007/0131809 | A1 | 6/2007 | Kawashita et al. | |
| 2008/0203130 | A1 | * 8/2008 | Kerschbaumer | ......... D21G 1/02 |
| | | | | 226/108 |
| 2015/0194652 | A1 | 7/2015 | Okihiro et al. | |
| 2015/0202647 | A1 | 7/2015 | Watanabe et al. | |

FOREIGN PATENT DOCUMENTS

| | | | |
|---|---|---|---|
| CN | 102921602 A | | 2/2013 |
| JP | 2001-180859 A | | 7/2001 |
| JP | 2008-6322 A | | 1/2008 |
| JP | 2011-181459 | * | 9/2011 |

(Continued)

OTHER PUBLICATIONS

Office Action dated Feb. 20, 2017 in KR Application No. 10-2016-0064550.

(Continued)

*Primary Examiner* — Brian K Talbot
(74) *Attorney, Agent, or Firm* — Panitch Schwarze Belisario & Nadel LLP

(57) ABSTRACT

A method for producing a functional film is provided. In the method, a film is sequentially transferred through processing devices including a film inspection device. At least one expander roll is used for film transfer from a processing device to the film inspection device next to the processing device.

12 Claims, 8 Drawing Sheets

(56) References Cited

FOREIGN PATENT DOCUMENTS

| | | |
|---|---|---|
| JP | 2012-153436 A | 8/2012 |
| JP | 2015-065110 A | 4/2015 |
| JP | 2015-130270 A | 7/2015 |
| KR | 2006-0093333 A | 8/2006 |
| KR | 2013-0098275 A | 9/2013 |
| KR | 2015-0042217 A | 4/2015 |
| KR | 2015-0111946 A | 10/2015 |

OTHER PUBLICATIONS

Decision to Grant dated Sep. 13, 2016 in JP Application No. 2015-250569 (English Translation Only).
Office Action dated Jul. 14, 2016 in KR Application No. 2016-0064550.
Office Action dated May 24, 2016 in JP Application No. 2015-250569.
Office Action dated Nov. 9, 2016 in KR Application No. 10-2016-0064550.
Office Action dated Dec. 11, 2017 in CN Application No. 201611190397.0.
Office Action dated May 8, 2018 in CN Application No. 201611190397.0.

* cited by examiner

FIG. 2
(a)
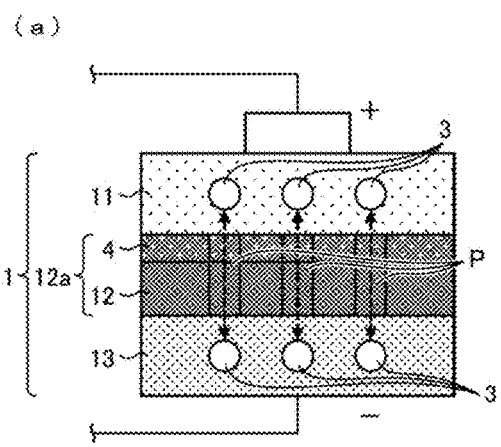
(b)
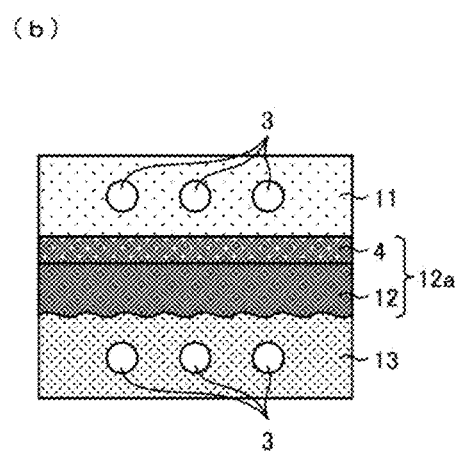

METHOD FOR PRODUCING SEPARATOR FILM

This Nonprovisional application claims priority under 35 U.S.C. § 1119 on Patent Application No. 2015-250569 filed in Japan on Dec. 22, 2015, the entire contents of which are hereby incorporated by reference.

TECHNICAL FIELD

The present invention relates to production of a functional film.

BACKGROUND ART

Patent Literature 1 discloses a configuration of a coating device including a coating roll for coating a film and a plurality of transfer rollers, in which configuration an expander roller is provided on an upstream side of the coating roll in a direction in which the film is transferred.

Patent Literature 2 discloses an inspection technique according to which inspection for coating thickness, coaling width, and coating defect is carried out after a long coated base material, to which a coating solution has been applied, is transferred via a plurality of rollers.

CITATION LIST

Patent Literatures

[Patent Literature 1] Japanese Patent Application Publication Tokukai No. 2015-130270 (Publication date: Jul. 16, 2015)

[Patent Literature 2] Japanese Patent Application Publication Tokukai No. 2008-006322 (Publication date: Jan. 17, 2008).

SUMMARY OF INVENTION

Technical Problem

In an inspection step in production of a functional film, an accurate inspection result cannot be obtained in some cases due to, for example, wrinkles of a film to be inspected.

Solution to Problem

A method in accordance with an embodiment of the present invention for producing a functional film is a method, in which a film is sequentially transferred through processing devices including a film inspection device, wherein; at least one expander roll is used for film transfer from, a predetermined processing device to the film inspection device provided next to the predetermined processing device.

Advantageous Effects of Invention

According to the present invention, a film to be inspected is stretched along a width direction by an expander roll before inspection, so that wrinkling of the film is prevented. This makes it possible to accurately inspect the film.

BRIEF DESCRIPTION OF DRAWINGS (a) of FIG. 1 is a schematic view illustrating a cross sectional configuration of a lithium ion secondary battery; and (b) through (d) of FIG. 1 is each a schematic view illustrating respective states under different conditions of the lithium ion secondary battery.

FIG. 2 is a schematic view illustrating respective states under different conditions of a lithium ion secondary battery having a configuration different from the configuration illustrated in FIG. 1.

DESCRIPTION OF EMBODIMENTS

The following description discusses embodiments of the present invention, with reference to FIGS. 1 through 8.

The embodiments of the present invention will be discussed by taking, as an example, a separator film (may also be referred to as a separator) for lithium ion secondary battery(batteries). Application of the present invention, however, is not limited to cases where a separator film for lithium ion secondary batteries is produced. The present invention is applicable to production of various functional films. Specific examples of such functional films include separators and functional-layer containing separators.

(Configuration of Lithium Ion Secondary Battery)

A nonaqueous electrolyte secondary battery typified by a lithium ion secondary battery has a high energy density. Thus, such a nonaqueous electrolyte secondary battery is currently widely used not only as a battery for use in (i) devices such as a personal computer, a mobile phone, and a mobile information terminal, and (ii) movable bodies such as an automobile and an airplane, but also as a stationary battery contributive to stable electric power supply.

Figure 1:
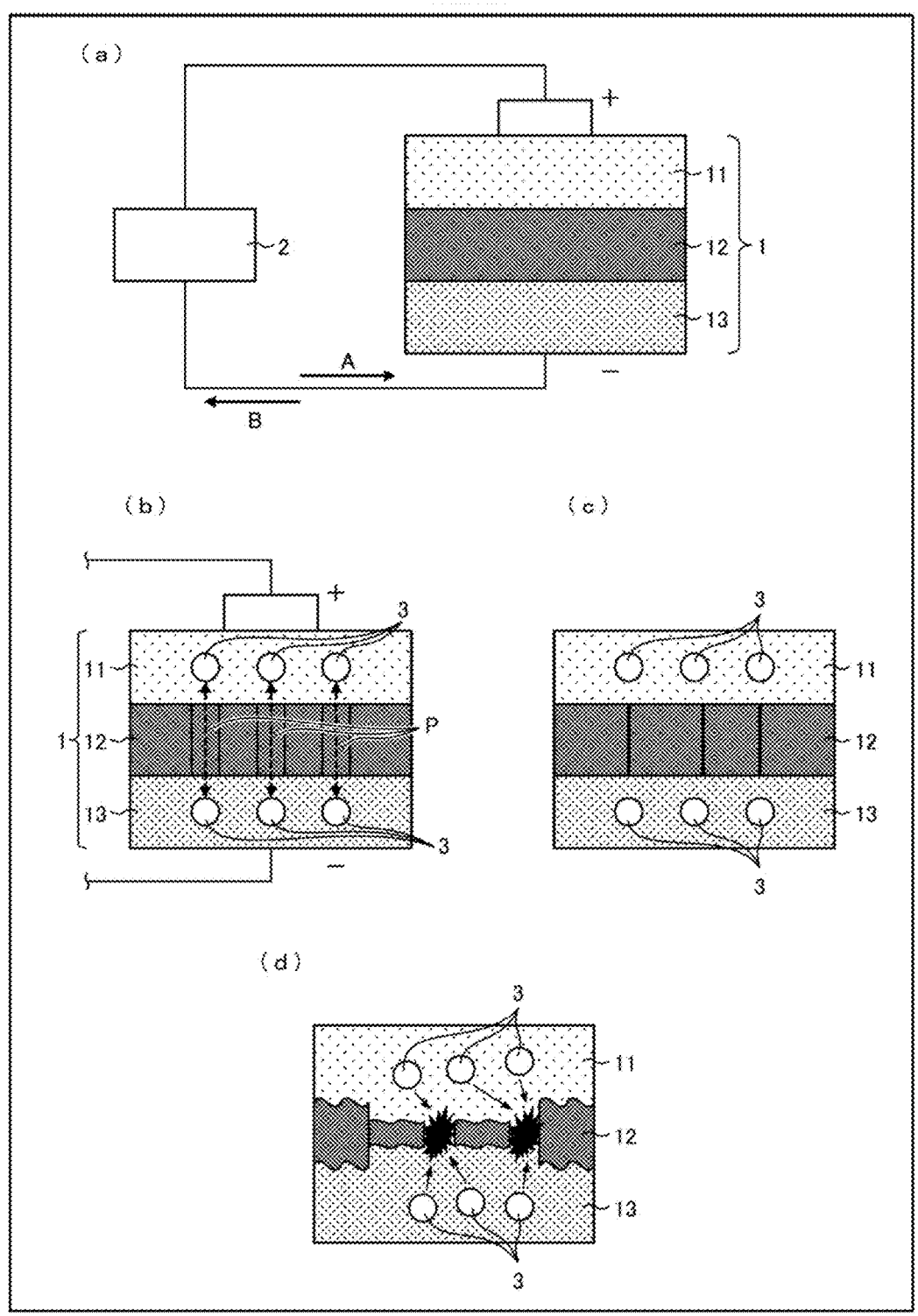

(a) of FIG. 1 is a schematic view illustrating a configuration of a cross section of a lithium ion secondary battery 1.

As illustrated in (a) of FIG. 1, the lithium ion secondary battery 1 includes a cathode 11, a separator 12, and &n anode 13. Between the cathode 11 and the anode 13, an external device 2 is connected outside the lithium ion secondary battery 1. While the lithium ion secondary battery 1 is being charged, electrons move in a direction A. Meanwhile, while the lithium ion secondary battery 1 is being discharged, electrons move in a direction B.

(Separator)

The separator 12 is provided so as to be sandwiched between the cathode 11, as a positive electrode, and the anode 13, as a negative electrode, of the lithium ion secondary battery 1. While separating the cathode 11 and the anode 13, the separator 12 allows lithium ions to move between the cathode 11 and the anode 13. The separator 12 contains, for example, polyolefin (e.g., polyethylene or polypropylene) as a material thereof.

(b) of FIG. 1 is a schematic view illustrating respective states under different conditions of the lithium ion secondary battery 1 illustrated in (a) of FIG. 1. (b) of FIG. 1 illustrates a state under a normal condition of the lithium ion secondary battery 1. (c) of FIG. 1 illustrates a state under a condition in which the lithium ion secondary battery 1 has increased in temperature. (d) of FIG. 1 illustrates a state under a condition in which the lithium ion secondary battery 1 has sharply increased in temperature.

As illustrated in (b) of FIG. 1, the separator 12 is provided with many pores P. Normally, lithium ions 3 in the lithium ion secondary battery 1 can move back and forth through the pores P.

Note here that there may be, for example, a case where the lithium ion secondary battery 1 increases in temperature due to, for example, overcharge of the lithium ion secondary battery 1 or a large current caused by a short circuit having occurred in the external device. In such a case, the separator 12 melts or softens, and the pores P are blocked (see (c) of FIG. 1). As a result, the separator 12 shrinks. This stops the movement of the lithium ions 3, and consequently stops the increase in temperature (described earlier).

Note, however, that the separator 12 suddenly shrinks in a case where the lithium ion secondary battery 1 sharply increases in temperature. In this case, as illustrated in (d) of FIG. 1, the separator 12 may be broken. Then, the lithium ions 3 leak out from the separator 12 which has been broken, so that the lithium ions 3 do not stop moving back and forth. Thus, the increase in temperature continues.

(Heat-Resistant Separator)

FIG. 2 is a schematic view illustrating respective states under different conditions of the lithium ion secondary battery 1 which has another configuration. (a) of FIG. 2 illustrates a state under a normal condition of the lithium ion secondary battery 1. (b) of FIG. 2 illustrates a state under a condition in which the lithium ion secondary battery 1 has sharply increased in temperature.

As illustrated in (a) of FIG. 2, the lithium ion secondary battery 1 can further include a heat-resistant layer 4. The heat-resistant layer 4 can be provided to the separator 12. (a) of FIG. 2 illustrates a configuration in which the heat-resistant layer 4, which serves as a functional layer, is provided to the separator 12. In the following description, as an example of a functional layer-including separator (i.e., a separator Including a functional layer), a film in which the heat-resistant layer 4 is provided to the separator 12 is regarded as a heat-resistant separator 12a. Further, in the following description, the separator 12 of the functional layer-including separator is regarded as a base material with respect to the functional layer.

According to the configuration illustrated in (a) of FIG. 2, the heat-resistant layer 4 is laminated to one side of the separator 12 which one side faces the cathode 11. Alternatively, the heat-resistant layer 4 can be laminated to the other side of the separator 12 which other side faces the anode 13, or to both sides of the separator 12. Further, the heat-resistant layer 4 is provided with pores that are similar to the pores P. Normally, the lithium ions 3 move back and forth through the pores P and the pores of the heat-resistant layer 4. The heat-resistant layer 4 contains, for example, wholly aromatic polyamide (aramid resin) as a material thereof.

As illustrated in (b) of FIG. 2, even in a case where the lithium ion secondary battery 1 sharply increases in temperature and the separator 12 melts or softens, a shape of the separator 12, which is supported by the heat-resistant layer 4, is maintained. Thus, such a sharp increase in temperature merely results in melting or softening of the separator 12 and consequent blocking of the pores P. This stops the movement of the lithium ions 3 and consequently stops overdischarge or overcharge (described earlier). The separator 12 is thus prevented from being broken.

(Flow of Production of Separator (Base Material))

First, the following description discusses production of a separator as a base material film by taking, as an example, a ease where the separator mainly contains polyethylene as a material thereof.

A production method to he taken as as example is exemplified by a method in which a film is formed by adding a pore-forming agent to thermoplastic resin and then the pore-forming agent is removed by use of an appropriate solvent. Specifically, the separator which is made of polyethylene resin containing ultrahigh-molecular-weight polyethylene is produced through the following steps (A) through (E) which are to be carried put in this order (see (a) of FIG. 3).

(A) Kneading Step

A (A) kneading step is a step of obtaining a polyethylene resin composition by kneading ultrahigh-molecular-weight polyethylene and an inorganic filler (pore-forming agent) such as calcium carbonate.

(B) Rolling Step

A (B) rolling step is a step of forming a film by use of the polyethylene resin composition obtained in the kneading step.

(C) Removal Step

A (C) removal step is a step of removing the inorganic filler from the film obtained in the rolling step.

(D) Drawing Step

A (D) drawing step is a step of drawing the film obtained in the removal step.

(E) Base Material Inspection Step

A (E) base material inspection step is a step of inspecting a drawn base material.

According to the above production method, many micropores are provided in the film in the (C) removal step. Then, micropores in the film which has been drawn by the (D) drawing step serve as the pores P (described earlier). With this, the separator 12 which is a polyethylene microporous film having a given thickness and a given air permeability is formed. Note that the (D) drawing step can be carried out between the (B) rolling step and the (C) removal step.

In the (A) kneading step, it is possible to knead 100 parts by weight of the ultrahigh-molecular-weight polyethylene, 5 parts by weight to 200 parts by weight of low-molecular weight poly olefin having a weight average molecular weight of not more than 10,000, and 100 parts by weight to 400 parts by weight of the inorganic filler.

Note that a separator which contains material(s) besides the above materials can also be produced by a production process similar to the above production process. Note also that the method for producing the separator is not limited to the above method, in which the pore-forming agent is removed, and various methods can be used to produce the base material.

The following description discusses in detail individual steps in production of a separator (production of a base material and a film of a separator, for example, production of a separator for batteries).

[Embodiment 1]

Figure 3:
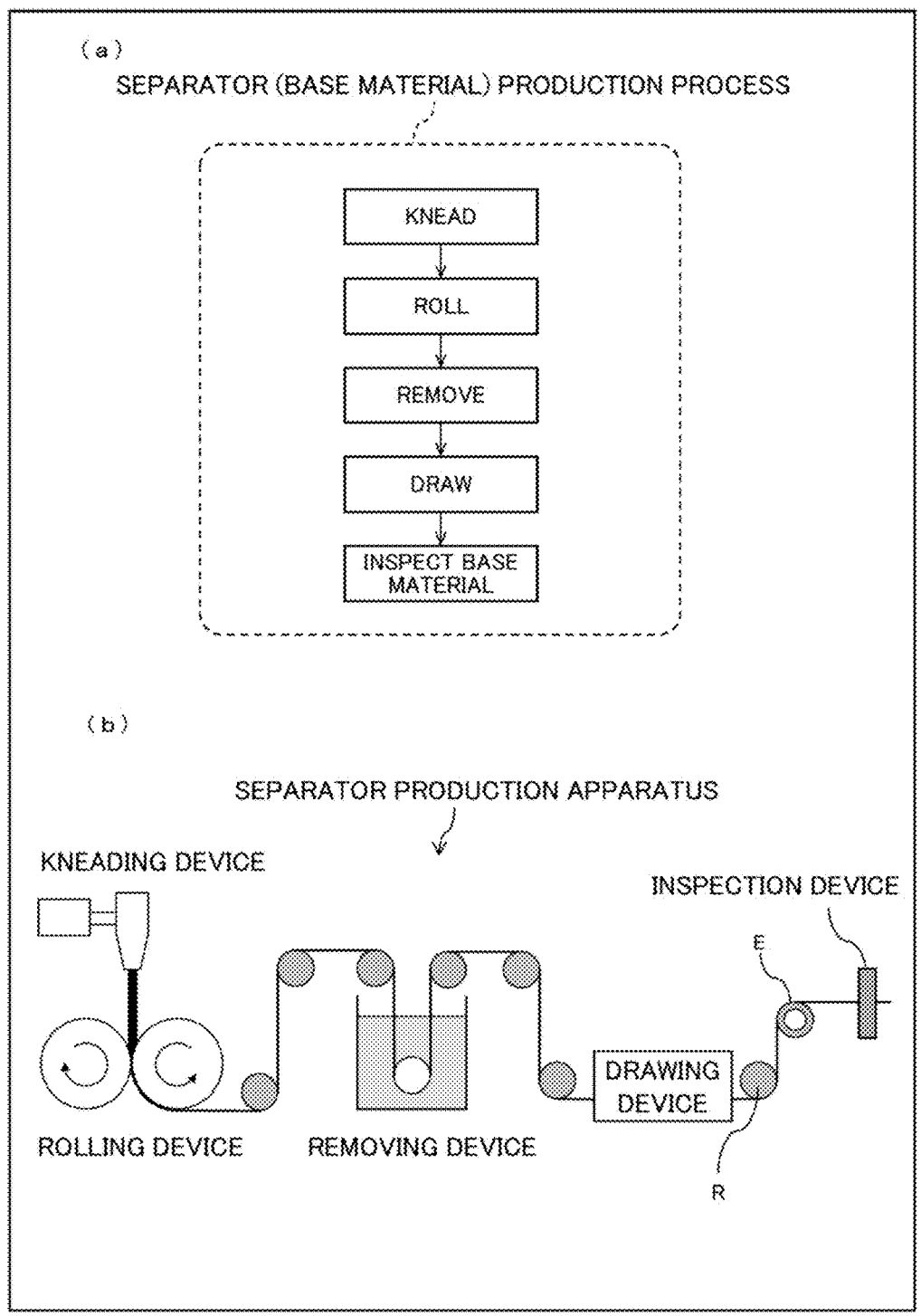
FIG. 3 is a schematic view illustrating production (steps and apparatus) of a separator in accordance with Embodiment 1.

(b) of FIG. 3 illustrates a separator production apparatus, which employs an expander roll E and a transfer roller (R)

that are used for transfer of a film from a rolling device to an inspection device that is provided next to the rolling device.

The expander roll in the present application means a roller having a function of expanding and widening the film being transferred. Use of the expander roll as a transfer roller for the film (base material) or a coated film makes it possible to prevent wrinkling of the film or the coated film.

Further, with use of the expander roll as the transfer roller, winkles can foe removed even in a case where the film or the coated film is wrinkled a little.

The film having been rolled is transferred to a removal device via at least one transfer roller R, and then an inorganic filler is removed from the film.

The film from which the inorganic filler has been removed is transferred to a drawing device via at least one transfer roller R, and then the film is drawn.

The film thus having been drawn is transferred to the inspection device via at least one expander roll E, and undergoes an inspection. The inspection is, for example, a contamination inspection and/or a pinhole inspection.

In the separator production apparatus illustrated in (b) of FIG. 3, the film is expanded by the expander roll E at a position close to the inspection device where the film is inspected. This makes it possible to prevent wrinkling of the film is prevented and thereby to accurately inspect the film.

Figure 4:
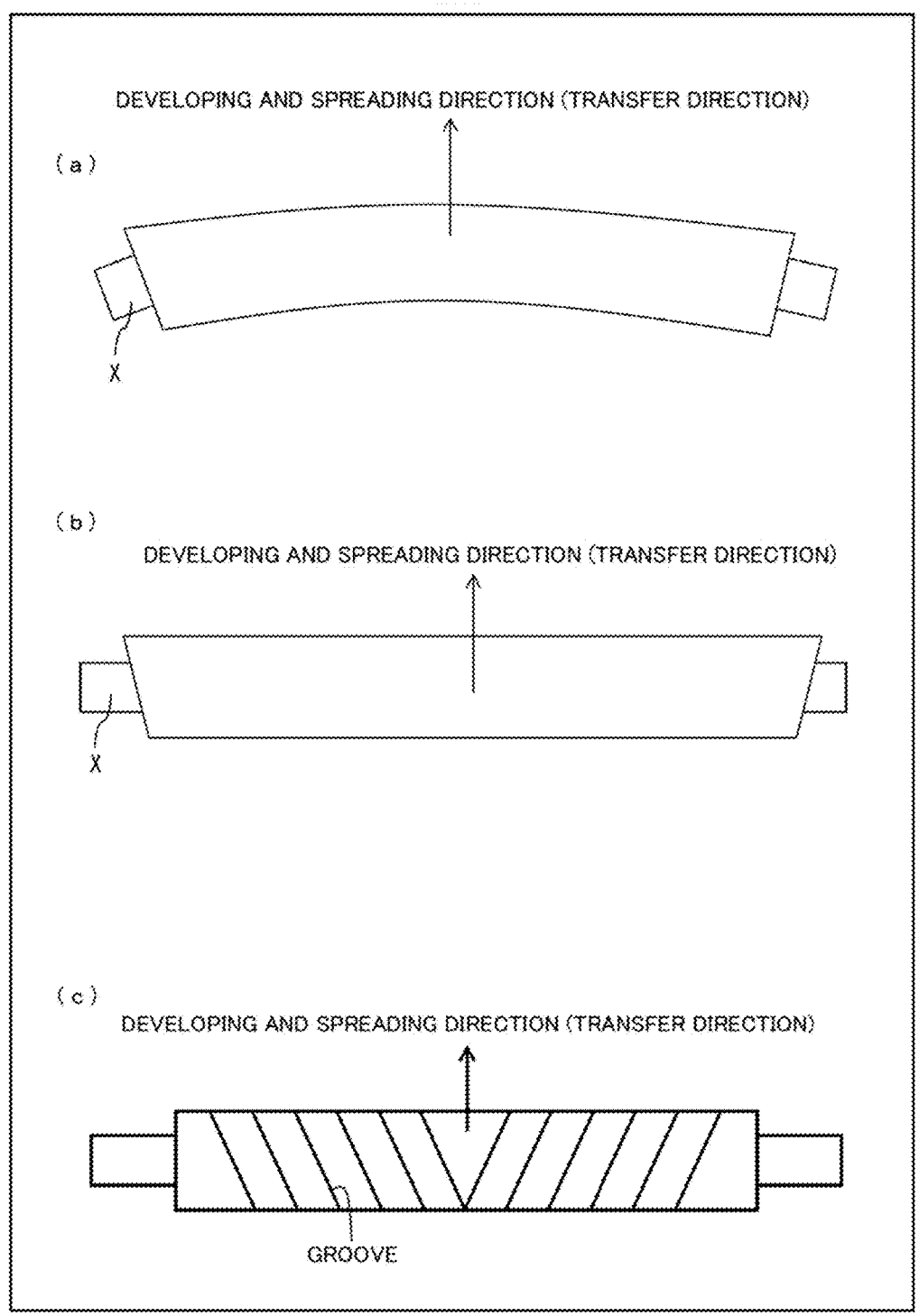
FIG. 4 is a top view illustrating different types of expander rolls.

The expander roll E may be a curved roll (roll curved in a longitudinal direction, which is also called a banana roll) (see (a) of FIG. 4), a non-curved linear roll (not curved in a longitudinal direction) (sec (b) of FIG. 4), or a non-curved linear roll (not curved in a longitudinal direction) having a helical groove (see (c) of FIG. 4). Note that a tube (e.g., rubber tube) arranged to cover a shaft X may be rotated while the shaft X is not rotated, or alternatively, the shaft X may be rotated. The expander roll arranged as illustrated in either (a) or (b) of FIG. 4 develops and spreads a transferred object (film f or coated film P) along a transfer direction, so that the transferred object is expanded (prevented from wrinkling).

Mote that the curved roll has such an advantage that dust is unlikely to be generated due to friction, whereas the non-curved linear roll has such an advantage that an excessive stretch in a center area in a width direction of the film f or P and sags in the vicinity of width wise ends in the width direction of the film f or P are unlikely to occur.

The expander roil has a surface made of a soft material such as rubber (e.g., ethylene-propylene rubber, acrylonitrile-butadiene rubber) or silicone, or of a hard material such as metal.

The surface of the expander roll is preferably a smooth curved surface. With this configuration, dust generated due to friction, or the like is unlikely to accumulate on the roller. This subsequently makes it possible to prevent a phenomenon that dust having been generated due to friction and accumulated on the roller attaches to the film f or the coated film F. Further, the expander roll in the present invention preferably extends along the width direction of the film.

(Flow of Production of Functional Layer-Including Separator)

The following description discusses a flow of production of a functional layer-including separator.

Figure 5:
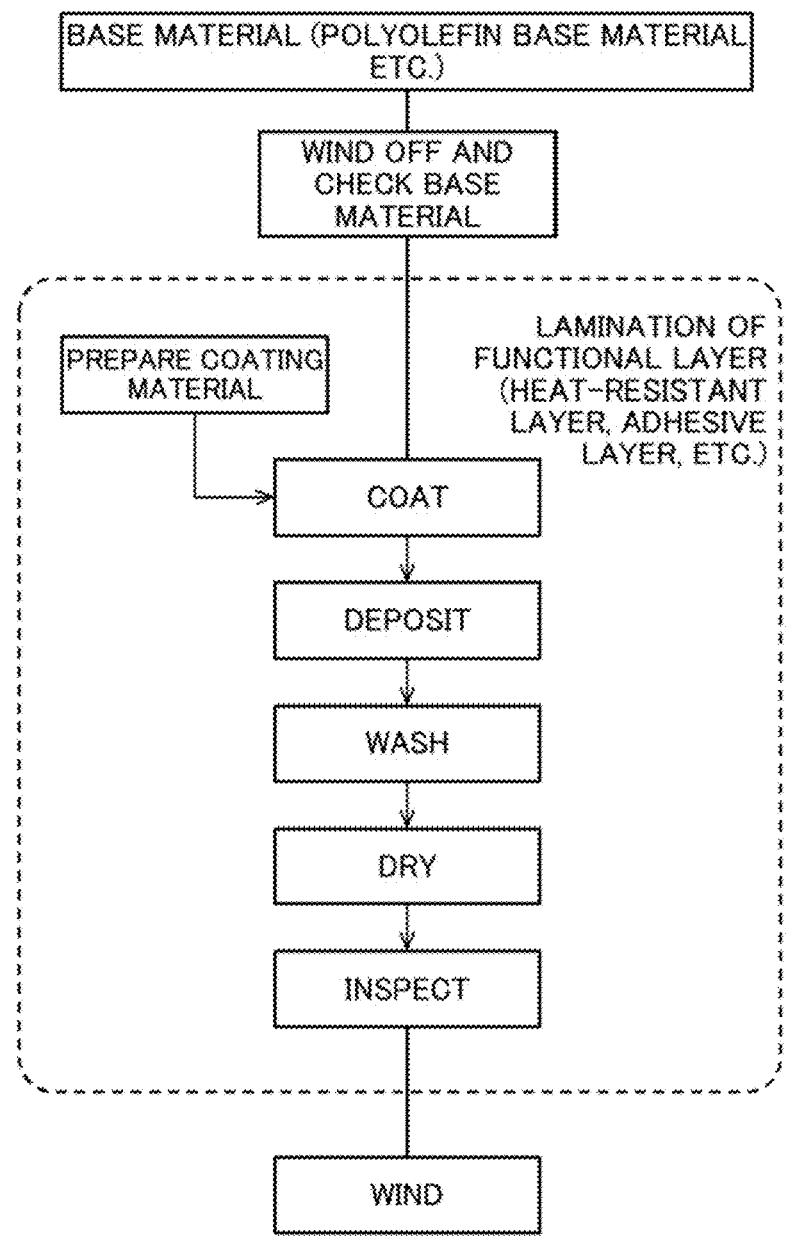
FIG. 5 is a flow diagram showing a production process of a functional film.

FIG. 5 is a flow diagram schematically showing a process for producing the functional layer-including separator.

The functional layer-including separator is configured to include a functional layer that is laminated to a separator serving as a base material.

As the base material, a film made of, for example, polyolefin is used. The functional layer is exemplified by a heat-resistant layer and an adhesive layer.

The functional layer is laminated to the base material by coating the base material with, for example, a coating material that is suited to the functional layer, and drying the coated base material.

FIG. 5 illustrates a flow of production of a heat-resistant separator in a ease where the functional layer is a heat-resistant layer. According to the illustrated flow, wholly aromatic poly amide (aramid resin), which is used as a material of which the heat-resistant layer is made, is laminated to a poly olefin base material.

This flow includes the steps of coating, deposition, washing, and drying. After lamination of the heat-resistant layer to the base material, a resultant film is subjected to inspection and subsequent slitting.

The following description discusses steps included in the process for producing the functional layer-including separator.

(Process for Producing Functional Layer-Including Separator)

A process for producing a heat-resistant separator which includes, as the functional layer, a heat-resistant layer made of aramid resin includes the following steps (a) through (g).

Specifically, the process for producing the heat-resistant separator includes (a) a base material (separator (film)) unwinding and checking step, (b) a coating step of applying a coating material (functional material), (c) a deposition step carried out by, for example, humidification, (d) a washing step, (e) a drying step, (f) a coated article inspecting step, and (g) a winding step, which are carried out in this order. Further, the process for producing the heat-resistant separator may include, in addition to the above steps (a) through (g), a base material producing (film-forming) step provided before the (a) base material unwinding and checking step, and/or a slitting step after the (g) winding step. Meanwhile, the (c) deposition step carried out by, for example, humidification and/or (d) the washing step can be omitted depending on a configuration of the functional layer.

The following description discusses the steps (a) through (g) in this order.

(a) Base Material Unwinding and Checking Step

The (a) base material unwinding and checking step includes sub-steps of; unwinding, from a roller, a separator original sheet film serving as the base material of the functional layer-including separator; and checking the unwound base material in advance of the subsequent coating step.

(b) Coating Step of Applying a Coating Material

The (b) coating step of applying a coating material is a step of coating, with a coating material as the functional material, the base material which has been unwound in the step (a).

The following description discusses a method for laminating, to the base material, the heat-resistant layer serving as the functional layer. Specifically, the base material is coated with an NMP (N-methyl-pyrolidone) solution of aramid, which serves as a coating material for formation of the heat-resistant layer. Note that the heat-resistant layer is not limited to the above aramid heat-resistant layer. For example, the base material can be coated with a suspension containing an inorganic filler (e.g., a suspension containing alumina, carboxymethylcellulose, and water), which serves as a coating material for formation of the heat-resistant layer.

A method for coating the base material with a coating material is not particularly limited provided that uniform wet coating can be carried out by the method. The method can be exemplified by various methods such as a capillary coating method, a slit die coating method, a spray coating method, a dip coating method, a roller coating method, a screen printing method, a flexo printing method, a gravure coater method, a bar coater method, and a die coater method.

The heat-resistant layer 4 has a thickness which can be controlled by adjusting a thickness of a coating material with which the base material is coated, or adjusting a solid-content concentration of a coating material.

Note that the functional layer can be provided on only one side of the base material or on both sides of the base material.

(c) Deposition Step

The (c) deposition step is a step of solidifying the coating material with which the base material has been coated in the step (b). In a case where the coating material is an NMP solution of aramid, aramid is solidified by, for example, providing vapor to a coating surface and thereby causing humid deposition.

(d) Washing Step

The (d) washing step is a step of removing a solvent by washing the coating material having undergone the (c) deposition step. As a result of removal of the solvent, an aramid heat-resistant layer is formed on the base substrate. In a case where the heat-resistant layer is the aramid heat-resistant layer, water, an aqueous solution, or an alcoholic-solution, for example is suitably used as a washing liquid.

(e) Drying Step

The (e) drying step is a step of drying the functional layer-including separator which has been washed in the step (d).

A method for drying the functional layer-including separator is not particularly limited but can be various methods such as a method of bringing the functional layer-including separator into contact with a heated roller, and a method of blowing hot air on the functional layer-including separator.

(f) Coated Article Inspecting Step

The (f) coated article inspecting step is a step of inspecting the dried functional layer-including separator.

During the inspection, a defective part may be marked as appropriate so that the defective part can be easily removed.

(g) Winding Step

The (g) winding step is a step of winding the functional layer-including separator which has been inspected.

The winding can be carried out by appropriately using, for example, a cylindrical core.

The wound functional layer-including separator can be, for example, directly shipped in the form of a wide original sheet. Alternatively, if necessary, the wound functional layer-including separator can be formed into a slit separator by being slit so as to have a narrow width such as a product width.

The following describes in detail individual steps in production of a functional layer-including separator (production of a functional film, for example, production of a separator for batteries).

[Embodiment 2]

Figure 6:
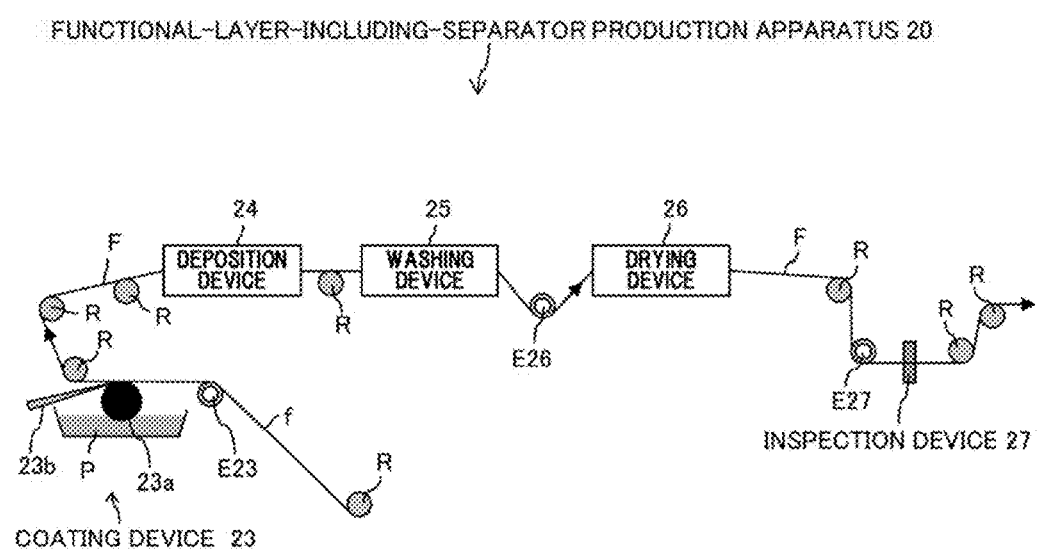
FIG. 6 is a schematic view illustrating a configuration of an apparatus in accordance with Embodiment 2 for producing a functional film.

FIG. 6 is a schematic view illustrating an example configuration of a functional-layer-including-separator production apparatus in accordance with Embodiment 2. The functional-layer-including-separator production apparatus 20 illustrated in FIG. 6 is an apparatus for producing a functional layer-including separator by sequentially-transferring an unwound film f (base material) through a plurality of processing devices (23 through 27), which includes a coating device 23 and an inspection device 27 for a coated film F.

As illustrated in FIG. 6, the functional-layer-including-separator production apparatus 20 includes a coating device 23 which carries out the above (b) coating step of applying a coating material, a deposition device 24 which carries out the above (c) deposition step, a washing device 25 which carries out the above (d) washing step, a drying device 26 which carries out the above (e) drying step, and an inspection device 27 which carries out the above (f) coated article inspecting step.

The film f is caused to pass through the coating device 23, and further caused, as the coated film F, to pass through the deposition device 24, the washing device 25, and the drying device 26. Then, the film F is transferred to the inspection device 27. While the film f or F passes through the above devices (23 through 27), the film undergoes respective processes corresponding to these devices (23 through 27).

The coating device 23 has, for example, a mechanism for a gravure coater method, and includes a gravure roll 23a and a doctor blade 23b. In this mechanism, the gravure roll 23a has a top end which is in contact with the film f and a bottom end immersed, in a coating material P. The coating material at depressions on a surface of the gravure roll 23a is applied to the film f when the gravure roll 23a is rotated. Note that an excess coating material on the surface of the gravure roll 23a is scraped off by the doctor blade 23b.

The functional-layer-including-separator production apparatus illustrated in FIG. 6 employs an expander roll E27 and a transfer roller (R) for transfer of the coated film F from the drying device 26 to the inspection device 27 that is provided next to the drying device 26.

Specifically, the unwound film f is transferred to the coating device 23 via at least one transfer roller and then subjected to a coating process (application of a coating material).

In a case where the functional layer-including separator to be produced is a separator for batteries, for example, the film f is a polyolefin porous film and the film f is coated with a coating material (coating solution), so that a porous layer is formed on the polyolefin porous film.

The film (coated film F), for which the coating process has been completed, is transferred to the deposition device 24 via at least one transfer roller R, and then is subjected to a deposition process on the coating material.

The coated film F, for which the deposition process has been completed, is transferred to the washing device 25 via at least one transfer roller R, and then, the coating material having undergone the deposition process is washed.

The coated film F having been washed is transferred to the drying device 26 via the expander roll E26, and the coating material having been washed is dried.

The coated film F having been dried is transferred to the inspection device 27 via the expander roll E27, and then, the coated film F (e.g., laminated porous film) having been dried is subjected to an inspection. Examples of the inspection include a coating inspection, a contamination inspection, and a pinhole inspection.

In the functional-layer-including-separator production apparatus illustrated in FIG. 6, the coated film F is expanded by the expander roll E27 at a position close to the inspection device 27 where the coated film F is inspected. This makes it possible to prevent wrinkling of the film is prevented and thereby to accurately inspect the coated film F. Note that the expander roll E27 can be located at a position immediately before the inspection device 27.

Further, the film f is expanded by the expander roll E23 at a position close to the coating device 23 where the film f is coated. This makes it possible to prevent, wrinkling of the film and thereby to uniformly coat, the film f. Note that the expander roll E23 can be located at a position immediately before the coating device 23.

Further, In the configuration illustrated in FIG. 6, a transfer distance between expander rolls (E23 to E26 and E26 to E27) is set to be not less than 10 m. This minimizes the number of expander rolls which are relatively expensive and likely to generate dust due to friction with the base material. Accordingly, while necessary expansion (prevention of wrinkling) of the film f or F is ensured, it is possible to reduce cost and to save the trouble of removing dust.

The expander rolls E23, E26, and E27 each can be a curved roll (roll curved in a longitudinal direction, which is also called a banana roll) (see (a) of FIG. 4), or a non-curved linear roll (not curved in a longitudinal direction) (see (b) of FIG. 4).

The expander rolls E23, B26, and E27 each have a surface made of a soft material such as rubber (e.g., ethylene-propylene rubber, acrylonitrile-butadiene rubber) or silicone, or of a hard material such as metal. Further, the surface of the expander roll is preferably a smooth curved surface (e.g., surface having no groove). This makes dust generated due to friction or the like unlikely to accumulate on the expander roll. This subsequently makes it possible to prevent a phenomenon that dust having been generated due to friction and accumulated on the expander roll attaches to the film f or the coated film F.

[Embodiment 3 ]

Figure 7:
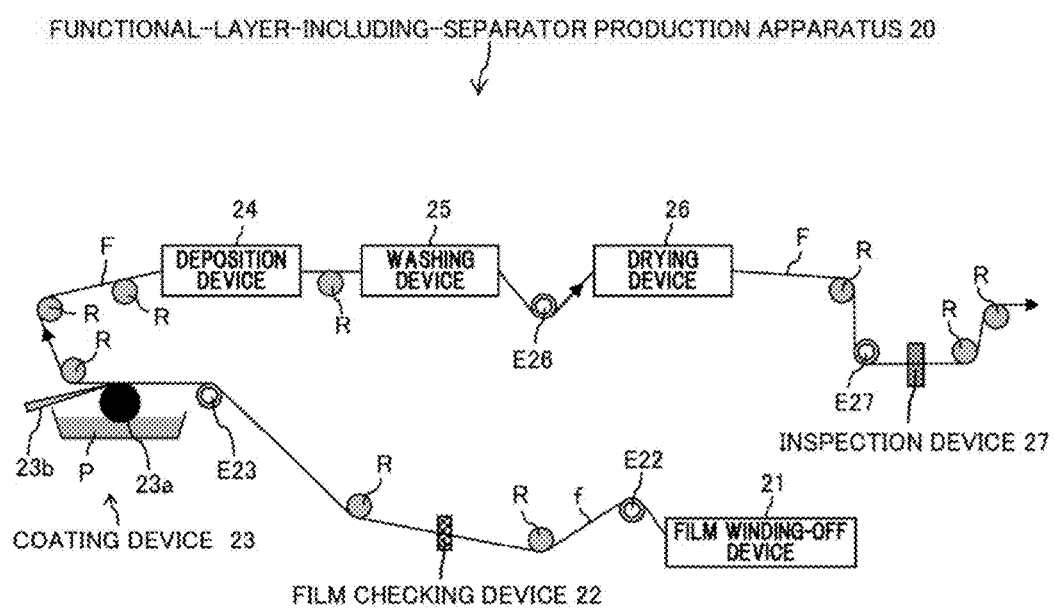
FIG. 7 is a schematic view illustrating a configuration of an apparatus an accordance with Embodiment 3 for producing a functional film.

FIG. 7 is a schematic view illustrating an example configuration of a functional-layer-including-separator production apparatus in accordance with Embodiment 3. The functional-layer-including-separator production apparatus 20 illustrated in FIG. 7 is an apparatus for producing a functional layer-including separator by sequentially transferring an unwound film f (base material), which has been wound off from a film winding-off device 21, through a plurality of processing devices (23 through 27), which includes a coating device 23 and an inspection device 27 for a coated film F.

As illustrated in FIG. 7, the functional-layer-including-separator production apparatus 20 includes a film winding-off device 21 and a film checking device 22 which carries out the above (a) base material unwinding and checking step, a coating device 23 which carries out the above (b) coating step of applying a coating material, a deposition device 24 which carries out the above (e) deposition step, a washing device 25 which carries out the above (d) washing step, a drying device 26 which carries out the above (e) drying step, and an inspection device 27 which carries out the above (f) coated article inspecting step.

The film f having been wound off from the film winding-off device 21 is caused to pass through the film checking device 22 and the coating device 23, and further caused, as the coated film F, to pass through the deposition device 24, the washing device 25, and the drying device 26. Then, the film F is transferred to the inspection device 27. While the film f or F passes through the above devices (22 through 27), the film undergoes respective processes corresponding to these devices (22 through 27).

The functional-layer-including-separator production apparatus illustrated in FIG. 7 employs an expander roll E22 and a transfer roller (R) for transfer of the film f from the film winding-off device 21 to the film checking device 22 that is provided next to the film winding-off device 21.

Specifically, the film f having been wound off from the film winding-off device 21 is transferred to the film checking device 22 via the expander roll E22 and the transfer roller (R) and subjected to a film checking process. The film f having passed the film checking process is transferred to the coating device 23 via the expander roll B23 and the transfer roller (R) and then subjected to a coating process (application of a coating material).

In a case where the functional layer-including separator to be produced is a separator for batteries, for example, the film f is a polyolefin porous film and the film f is coated with a coating material (coating solution), so that a porous layer is formed on the polyolefin porous film.

The film (coated film P), for which the coating process has been completed, is transferred to the deposition device 24 via at least one transfer roller R, and then is subjected to a deposition process on the coating material.

The coated film F, for which the deposition process has been completed, is transferred to the washing device 25 via at least one transfer roller R, and then the coating material having undergone the deposition process is washed.

The coated film F having been washed is transferred to the drying device 26 via the expander roll E26, and the coating material having been washed is dried.

The coated film F having been dried is transferred to the inspection device 27 via the expander roll E27, and then the coated film F (e.g., laminated porous film) having been dried is subjected to an inspection. Examples of the inspection include a coating inspection, a contamination inspection, and a pinhole inspection.

In the functional-layer-including-separator production apparatus illustrated in FIG. 7, the coated film F is expanded by the expander roll E27 at a position close to the inspection device 27 where the coated film F is inspected. This makes it possible to prevent wrinkling of the film and thereby to accurately inspect, the coated film F, Note that the expander roll E27 can be located at a position immediately before the inspection device 27.

Further, the film f is expanded by the expander roll E23 at a position close to the coating device 23 where the film f is coated. This makes it possible to appropriately coat the film f. Note that the expander roll E23 can be located at a position immediately before the coating device 23.

Further, the film f is expanded by the expander roll E22 at a position close to the film checking device 22 where the film f is checked. This makes it possible to prevent wrinkling of the film f and thereby to accurately check the film f.

Furthermore, the expander roll E22 is provided immediately after the film winding-off device 21, as illustrated in FIG. 7. This makes it possible not only to prevent wrinkling of the film f which has just been wound off but also to remove wrinkles of this film f.

Further, in the configuration illustrated in FIG. 7, a transfer distance between expander rolls (E22 to E23, E23 to E26 and E26 to E27) is set to be not less than 10 m. This minimizes the number of expander rolls which are relatively expensive and likely to generate dust due to friction with the base material. Accordingly, while necessary expansion (prevention of wrinkling) of the film f of F is ensured, it is possible to reduce cost and to save the trouble of removing dust.

The expander rolls E22, E23, E28, and E27 each can be a curved roll (also called a banana roll) as illustrated in (a) of FIG. 4), or a non-curved linear roll as illustrated in (b) of FIG. 4.

The expander rolls E22, E23, E26, and E27 each have a surface made of a soft material such as rubber (e.g., ethylene-propylene rubber, acrylonitrile-butadiene rubber) or silicone, or of a hard material such as metal. Further, the surface of the expander roll is preferably a smooth curved surface (e.g., surface having no groove). This makes dust generated due to friction or the like unlikely to accumulate on the expander roll. This subsequently makes it possible to prevent a phenomenon that dust having been generated due to friction and accumulated on the expander roll attaches to the film f or the coated film F.

[Embodiment 4]

Figure 8:
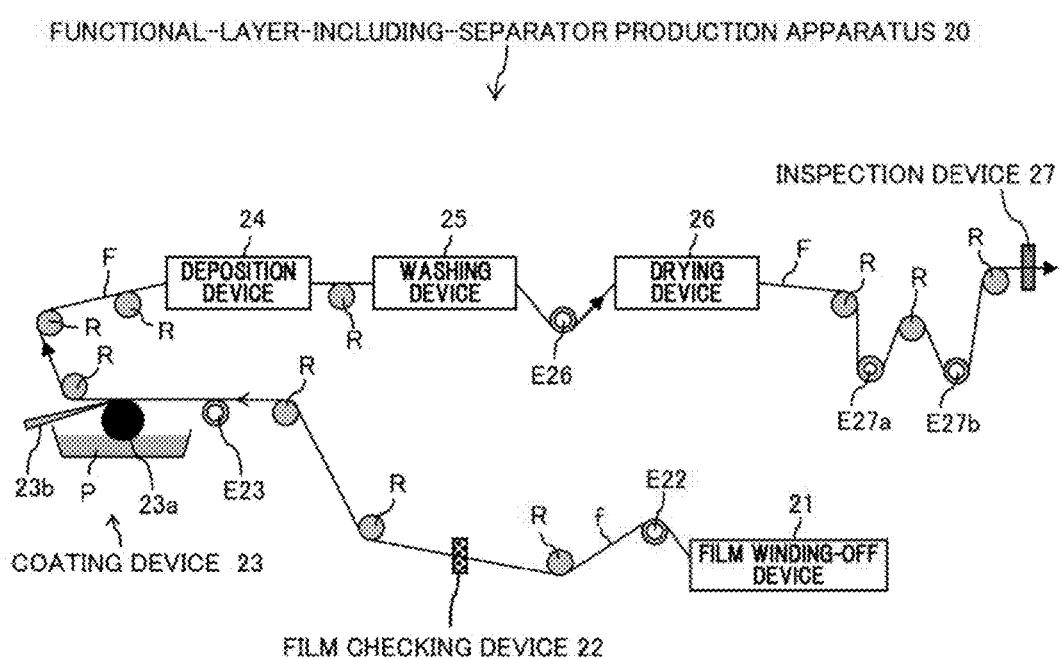
FIG. 8 is a schematic view illustrating a configuration of an apparatus in accordance with Embodiment 4 for producing a functional film.

The functional-layer-including-separator production apparatus illustrated in FIG. 7 can also be configured as illustrated in FIG. 8. In other words, the coated film F having been dried in the drying device 26 is transferred to the inspection device 27 via two expander rolls E27a and E27b, and transfer rollers (R). Then, the coating film (e.g., laminated porous film having been dried is inspected.

Embodiment 4 is configured to provide a transfer roller R that is not an expander roll, between the expander rolls E27a and E27b, and the two expander rolls E27a and E27b are configured to be different from each other in at least either shape or surface material. For example, Embodiment 4 is configured such that while the expander roll E27a is a non-curved linear roll (whose surface is made of a hard material) as illustrated in (b) of FIG. 4, the expander roll E27b is a curved roll (whose surface is made of a soft material) as illustrated in (a) of FIG. 4.

In the above configuration, the coated film F is effectively expanded (prevented from wrinkling) by the two expander rolls E27a and E27b different from each other in character, at a position close to the inspection device 27 where the coated film F is inspected. This makes it possible to inspect the coated film F more accurately.

In addition, since the transfer roller (R) that is not an expander roll is provided on a transfer path between the expander roll E27a and the expander roll 27b, a wrap angle of the film F on each of the expander rolls can be increased.

[Main Points]

As described above, a method in accordance with an embodiment of the present invention for producing a functional film is a method in which a film (f, F) is sequentially transferred through processing devices including a film inspection device (27), wherein: at least one expander roll (E27) is used for film transfer from a predetermined processing device (e.g., drying device 26) to the film inspection, device (27) provided next to the predetermined processing device.

According to the above method, the film (f, F) is expanded (prevented from wrinkling) by the expander roll (E27) at a position close to the inspection device (27) where film inspection is carried out. This makes it possible to carry out accurate film inspection.

For the film inspection, a work space is required so that, for example, a space for installation of an inspection device may be ensured. Accordingly, a distance between transfer rollers tends to be longer in a place where the film inspection is carried out, and consequently, the film (f, F) may easily wrinkle in such a place.

The method in accordance with an embodiment of the present invention for producing a functional film is arranged such that: at least one expander roll (E22) is used for film transfer from a film winding off device (21) to a film checking device (22) which is a processing device provided next to the film winding-off device.

According to the above method, film expansion (prevention of film wrinkling) is carried out by the expander roll (E22) immediately before film check by the film checking device (22). This makes it possible to carry out accurate film check.

The method in accordance with an embodiment of the present invention for producing a functional film, can be arranged such that: at least one expander roll (E23) is used for film transfer from the film checking device (22) to a coating device (23).

According to the above method, the film expansion (prevention of film wrinkling) is carried out by the expander roll (E23) at a position close to the coating device (23) where film coating is carried out. This makes it possible to carry out uniform film coating.

The method in accordance with an embodiment of the present invention for producing a functional film can be arranged such that: at least one expander roll (E26) is used for film transfer from the coating device (23) to the predetermined processing device (e.g., drying device 26).

The method in accordance with an embodiment of the present invention for producing a functional film, can be arranged such that: the predetermined processing device is a drying device (26) for a coated film (F).

The method in accordance with an embodiment of the present invention for producing a functional film can be arranged such that: a film transfer distance between one expander roll and a next expander roll (E22 and E23, E23 and E26, and E26 and E27) on a transfer path is not less than 10 m.

According to the above method, it is possible to minimize the number of expander rolls (E22, E23, E26 and E27), which are relatively expensive and likely to generate dust due to friction. Accordingly, while necessary film expansion (prevention of film wrinkling) is ensured, it is possible to reduce cost and to save the trouble of removing dust.

The method in accordance with an embodiment of the present, invention for producing a functional film may be arranged such that: the at least one expander roll (E22, E23, E26 and E27) is a curved roll.

According to the above method, advantageously, dust is unlikely to be generated due to friction.

The method in accordance with an embodiment of the present invention for producing a functional film may be arranged such that; the at least one expander roll (E22, E23, E26 and E27) is a won-curved linear roll.

According to the above method, advantageously, an excessive stretch in a center area of the film (f, F) and sags in the vicinity of width wise ends of the film (f, F) are unlikely to occur.

The method in accordance with an embodiment of the present invention for producing a functional film may be arranged such that: the at least one expander roll (E22, E23, E26 and E27) has a smooth curved surface.

According to the above method, dust generated due to friction or the like is unlikely to accumulate on the expander rolls. This subsequently makes it possible to prevent a phenomenon that dust having been generated due to friction and accumulated on the expander rolls attaches to the film (f) or the coated film (F).

The method in accordance with an embodiment of the present invention for producing a functional film may be arranged such that: expander rolls (E27a and E27b) are used for film transfer from the predetermined processing device (e.g., drying device 26) to the film inspection device (27) provided next to the predetermined processing device.

According to the above method, the film expansion (prevention of film wrinkling) is carried out by for example, two expander rolls (E27a and E27b) at a position close to the inspection device (27) where film inspection is carried out. This makes it possible to carry out more accurate film inspection.

The method in accordance with an embodiment of the present invention for producing a functional film may be arranged such that: the expander rolls include two expander rolls (E27a and E27b) different from each other in at least either shape or surface material.

As described above, the two expander rolls (E27a and E27b) different from each other in at least either shape or surface material are used at a position preceding the inspection device (27). This makes it possible to carry out more effective film expansion (prevention of film wrinkling).

The method in accordance with an embodiment of the present invention for producing a functional film may be arranged such that: a transfer roller (R) not being an expander roll is provided on a transfer path between two (E27a and E27b) of the expander rolls. This can increase a wrap angle of the film (f, F) on each of the expander rolls.

The method in accordance with an embodiment of the present invention for producing a functional film may be arranged such that: the functional film is a laminated porous film including a polyolefin porous film (f) and a porous layer formed on the polyolefin porous film (f).

An apparatus in accordance with an embodiment of the present invention for producing a functional film, is an apparatus, in which a film is sequentially transferred through processing devices including a film inspection device, the apparatus including; at least one expander roll provided for film transfer from a predetermined processing device to the film inspection device provided next to the predetermined processing device.

In the above configuration, the film expansion (prevention of film wrinkling) is carried out by the expander roll (E27) at a position close to the inspection device (27) where film inspection is carried out. This makes it possible to carry out accurate film inspection.

The present invention is not limited to the description of the embodiments above, but may be appropriately altered on the basis of the common technical knowledge by a skilled person. An embodiment based on a proper combination of technical means disclosed in different embodiment's is also encompassed in the embodiments of the present invention.

REFERENCE SIGNS LIST 1 lithium ion secondary battery
4 heat-resistant layer (functional layer)
11 cathode
12 separator (base material)
12a heat-resistant separator (functional, layer-including separator)
13 anode
20 functional-layer-including-separator production apparatus
21 film winding-off device
22 film checking device
23 coating device
24 deposition device
25 washing device
26 drying device
27 inspection device
f film
F coated film
R transfer roller
E, E22 through E27, E27a and E27b expander roll

The invention claimed is:

1. A method for producing a separator film for a lithium ion secondary battery, in which a film is sequentially transferred through processing devices including a film inspection device, wherein:
at least two expander rolls are used for film transfer from a predetermined processing device to the film inspection device provided next to the predetermined processing device, and wherein no additional processing device is present between the predetermined processing device and the film inspection device.

2. The method as set forth in claim 1, wherein:
at least one further expander roll is used for film transfer from a film winding off device to a film checking device which is a processing device provided next to the film winding-off device.

3. The method as set forth in claim 2, wherein:
at least one further expander roll is used for film transfer from the film checking device to a coating device.

4. The method as set forth in claim 3, wherein:
at least one further expander roll is used for film transfer from the coating device to the predetermined processing device.

5. The method as set forth in claim 1, wherein:
the predetermined processing device is a drying device for a coated film.

6. The method as set forth in claim 1, wherein:
the at least two expander rolls include a curved roll.

7. The method as set forth in claim 1, wherein:
the at least two expander rolls include a non-curved linear roll.

8. The method as set forth in claim 1, wherein:
the at least two expander rolls include an expander roll having a smooth curved surface.

9. The method as set forth in claim 1, wherein:
the at least two expander rolls include two expander rolls different from each other in at least either shape or surface material.

10. The method as set forth in claim 1, wherein:
a transfer roller not being an expander roll is provided on a transfer path between two of the at least two expander rolls.

11. The method as set forth in claim 1, wherein:
the separator film is a laminated porous film including a polyolefin porous film and a porous layer formed on the polyolefin porous film.

12. The method as set forth in claim 8, wherein:
the at least two expander rolls include two expander rolls different from each other in shape.

* * * * *